United States Patent
Elliott et al.

(10) Patent No.: US 9,407,938 B2
(45) Date of Patent: Aug. 2, 2016

(54) METHOD FOR PROCESSING IMAGE AND ELECTRONIC DEVICE FOR THE METHOD

(71) Applicant: Samsung Electronics Co., Ltd., Suwon-si, Gyeonggi-do (KR)

(72) Inventors: Candice Hellen Brown Elliott, Santa Rosa, CA (US); Anthony Botzas, San Jose, CA (US); Michael Francis Higgins, Duncans Mills, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/733,213

(22) Filed: Jun. 8, 2015

(65) Prior Publication Data

US 2015/0365624 A1 Dec. 17, 2015

Related U.S. Application Data

(60) Provisional application No. 62/010,734, filed on Jun. 11, 2014.

(30) Foreign Application Priority Data

Jul. 7, 2014 (KR) .................. 10-2014-0084825

(51) Int. Cl.
*G06K 9/36* (2006.01)
*G06K 9/46* (2006.01)
*H04N 19/93* (2014.01)
*H04N 1/60* (2006.01)
*H04N 19/40* (2014.01)
*H04N 19/85* (2014.01)

(52) U.S. Cl.
CPC .............. *H04N 19/93* (2014.11); *H04N 1/60* (2013.01); *H04N 19/40* (2014.11); *H04N 19/85* (2014.11); *G06T 2207/10024* (2013.01)

(58) Field of Classification Search
CPC .............. G06T 2207/10024; H04N 19/40; H04N 19/85; H04N 19/93; H04N 1/60
See application file for complete search history.

(56) References Cited

U.S. PATENT DOCUMENTS

| | | | | |
|---|---|---|---|---|
| 2013/0064448 A1* | 3/2013 | Tomaselli | ............... | G06T 5/002 382/167 |
| 2013/0148886 A1* | 6/2013 | Misawa | .................. | G06K 9/36 382/165 |
| 2014/0270553 A1* | 9/2014 | Zund | ........................ | G06T 9/00 382/233 |

\* cited by examiner

*Primary Examiner* — Phuoc Tran
(74) *Attorney, Agent, or Firm* — Jefferson IP Law, LLP

(57) ABSTRACT

A side-channel encoding method for an electronic device is provided. The side-channel encoding method includes converting an original image into a down image by downscaling the original image, converting the down image into an up image by upscaling the down image, calculating a pixel-specific luminance variation between the original image and the up image by using a local average luminance for each pixel included in the original image, converting the pixel-specific luminance variation into a first variation binary signal by binarizing the luminance variation, converting the first variation binary signal into a second variation binary signal by simplifying the first variation binary signal, and outputting the second variation binary signal by including the second variation binary signal in the down image.

13 Claims, 11 Drawing Sheets
(4 of 11 Drawing Sheet(s) Filed in Color)

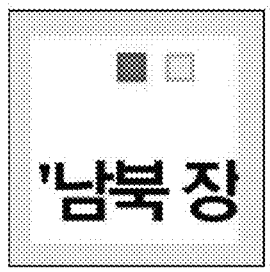 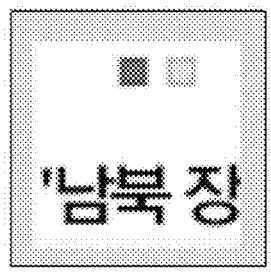 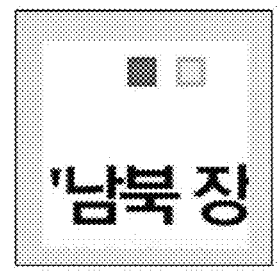
FIG.7A  FIG.7B  FIG.7C
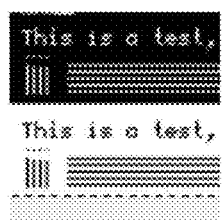 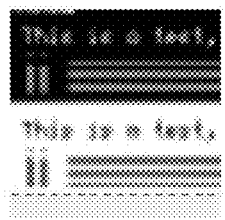 
FIG.8A  FIG.8B  FIG.8C

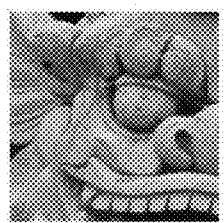 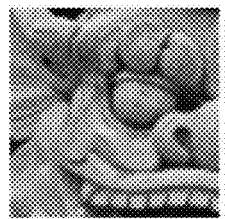 
FIG.9A        FIG.9B        FIG.9C
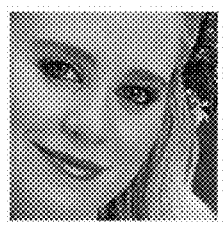 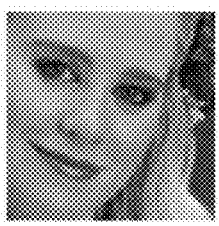 
FIG.10A        FIG.10B        FIG.10C

METHOD FOR PROCESSING IMAGE AND ELECTRONIC DEVICE FOR THE METHOD

CROSS-REFERENCE TO RELATED APPLICATION(S)

This application claims the benefit under 35 U.S.C. §119 (e) of a U.S. Provisional application filed on Jun. 11, 2014 in the U.S. Patent and Trademark Office and assigned Ser. No. 62/010,734, and under 35 U.S.C. §119(a) of a Korean patent application filed on Jul. 7, 2014 in the Korean Intellectual Property Office and assigned Serial number 10-2014-0084825, the entire disclosure of each of which is hereby incorporated by reference.

TECHNICAL FIELD

The present disclosure relates to a method for processing an image and an electronic device for performing the method.

BACKGROUND

Display resolutions of display devices have increased (for example, 4K or greater). However, image processing and memory resources are not substantially scaled up without dramatically increasing the cost (for example, electronic cost and power budget), making it difficult to adjust the resolution of the display device to a high-end resolution.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device capable of adjust a resolution of a display device to a high-end resolution without scaling up image processing and memory resources, and an image processing method for the electronic device.

In accordance with an aspect of the present disclosure, a method for encoding an image is provided. The method includes converting an original image into a down image by downscaling the original image, converting the down image into an up image by upscaling the down image, calculating a pixel-specific luminance variation between the original image and the up image by using a local average luminance for each pixel included in the original image, converting the pixel-specific luminance variation into a first variation binary signal by binarizing the luminance variation, converting the first variation binary signal into a second variation binary signal by simplifying the first variation binary signal, and outputting the second variation binary signal by including the second variation binary signal in the down image.

In accordance with another aspect of the present disclosure, an electronic device for performing side-channel encoding an image is provided. The electronic device includes a memory configured to store an original image and a processor configured to convert the original image into a down image by downscaling the original image, convert the down image into an up image by upscaling the down image, calculate a pixel-specific luminance variation between the original image and the up image by using a local average luminance for each pixel included in the original image, convert the pixel-specific luminance variation into a first variation binary signal by binarizing the luminance variation, convert the first variation binary signal into a second variation binary signal by simplifying the first variation binary signal, and output the second variation binary signal by including the second variation binary signal in the down image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain embodiments of the present disclosure will be more apparent from the following description taken in conjunction with the accompanying drawings, in which:

FIGS. 7A, 7B, 7C, 8A, 8B, 8C, 9A, 9B, 9C, 10A, 10B, and 10C illustrate images encoded according to various embodiments of the present disclosure;

Throughout the drawings, like reference numerals will be understood to refer to like parts, components, and structures.

DETAILED DESCRIPTION

Figure 1:
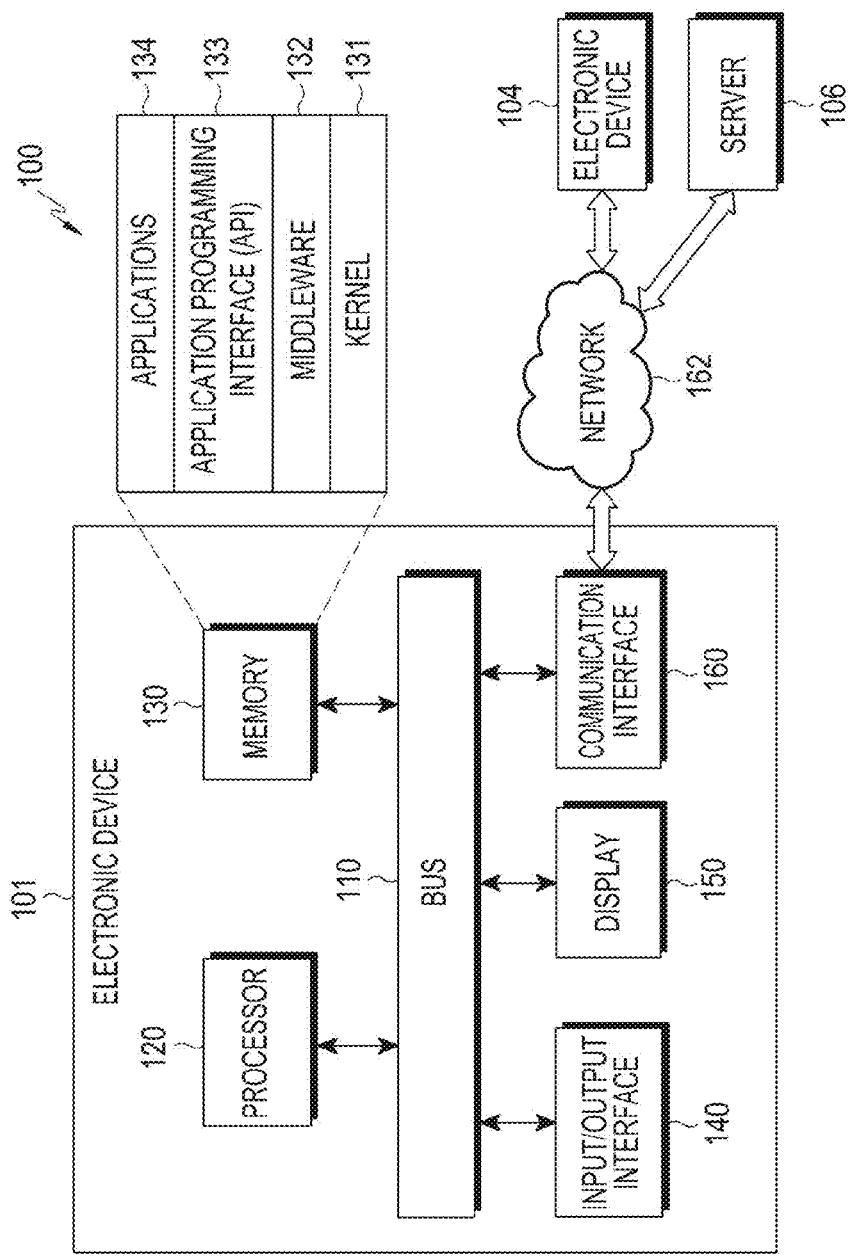
FIG. 1 conceptually illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" used in the various embodiments of the present disclosure indicates the presence of disclosed corresponding functions, operations, elements, or the like, and does not limit additional one or more functions, operations, elements, or the like. In addition, it should be understood that the term "include" or "has" used in the various embodiments of the present disclosure is to indicate the presence of features, numbers, operations, elements, parts, or a combination thereof described in the specifications, and does not preclude the presence or addition of one or more other features, numbers, operations, elements, parts, or a combination thereof.

The term "or" or "at least one of A or/and B" used in the various embodiments of the present disclosure includes any and all combinations of the associated listed items. For example, the term "A or B" or "at least one of A or/and B" may include A, B, or all of A and B.

Although the terms such as "first" and "second" used in the various embodiments of the present disclosure may modify various elements of the various embodiments, these terms do not limit the corresponding elements. For example, these terms do not limit an order and/or importance of the corresponding elements. These terms may be used for the purpose of distinguishing one element from another element. For example, a first user device and a second user device all indicate user devices or may indicate different user devices. For example, a first element may be named as a second element without departing from the right scope of the various embodiments of the present disclosure, and similarly, a second element may be named as a first element.

It will be understood that when an element is "connected" or "coupled" to another element, the element may be directly connected or coupled to the other element, and there may be another new element between the element and the another element. To the contrary, it will be understood that when an element is "directly connected" or "directly coupled" to another element, there is no other element between the element and the another element.

The terms used in the various embodiments of the present disclosure are for the purpose of describing particular embodiments only and are not intended to be limiting.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various embodiments of the present disclosure.

An electronic device according to various embodiments of the present disclosure may be a device including a communication function. For example, the electronic device may be a combination of one or more of a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), a digital audio player, mobile medical equipment, an electronic bracelet, an electronic necklace, an electronic appcessory, a camera, a wearable device (for example, a head-mounted device (HMD) such as electronic glasses), an electronic cloth, an electronic bracelet, an electronic necklace, an electronic appcessory, an electronic tattoo, and a smart watch.

According to various embodiments of the present disclosure, the electronic device may be a smart home appliance having a communication function. The electronic device may include, for example, a television (TV), a digital versatile disc (DVD) player, audio equipment, a refrigerator, an air conditioner, a vacuum cleaner, an oven, a microwave oven, a laundry machine, an air cleaner, a set-top box, a TV box (for example, HomeSync™ of Samsung, TV™ of Apple, or TV™ of Google), a game console, an electronic dictionary, an electronic key, a camcorder, and an electronic frame.

According to various embodiments of the present disclosure, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (for example, navigation system and gyro compass for ships), avionics, a security device, a vehicle head unit, an industrial or home robot, an automatic teller's machine (ATM), and a point of sales (POS).

According to various embodiments of the present disclosure, the electronic device may include a part of a furniture or building/structure having a communication function, an electronic board, an electronic signature receiving device, a projector, and various measuring instruments (for example, a water, electricity, gas, or electric wave measuring device). The electronic device according to various embodiments of the present disclosure may be one of the above-listed devices or a combination thereof. The electronic device according to various embodiments of the present disclosure may be a flexible device. It will be obvious to those of ordinary skill in the art that the electronic device according to various embodiments of the present disclosure is not limited to the above-listed devices.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device (for example, an artificial intelligence electronic device).

FIG. 1 conceptually illustrates a network environment 100 including an electronic device 101 according to various embodiments of the present disclosure.

Referring to FIG. 1, the electronic device 101 may include a bus 110, a processor 120, a memory 130, an input/output (I/O) interface 140, a display 150, and a communication interface 160.

The bus 110 may include a circuit for interconnecting the foregoing components and delivering communication (for example, a control message) among the components.

The processor 120 may receive a command from the foregoing other components (for example, the memory 130, the I/O interface 140, the display 150, or the communication interface 160) through the bus 110, interprets the received command, and executes an operation or data processing according to the interpreted command.

The memory 130 may store commands or data received from the processor 120 or other components (for example, the I/O interface 140, the display 150, or the communication interface 160) or generated by the processor 120 or other components. The memory 130 may include programming modules, for example, a kernel 131, middleware 132, an application programming interface (API) 133, or an application 134. Each of the foregoing programming modules may be configured with software, firmware, or hardware, or a combination of at least two of them.

The kernel 131 controls or manages system resources (for example, the bus 110, the processor 120, or the memory 130) used to execute an operation or a function implemented in other programs (for example, the middleware 132, the API 133, or the application 134). The kernel 131 provides an interface through which the middleware 132, the API 133, or the application 134 accesses separate components of the electronic device 101 to control or manage the system resources.

The middleware 132 may work as an intermediary for allowing, for example, the API 133 or the application 134 to exchange data in communication with the kernel 131. In regard to task requests received from the application 134, the middleware 132 performs control (for example, scheduling or load balancing) with respect to the task requests, for example, by giving at least one of the applications 134 priorities for using a system resource (for example, the bus 110, the processor 120, or the memory 130) of the electronic device 101.

The API 133 is an interface used for the application 134 to control a function provided by the kernel 131 or the middleware 132, and may include, for example, at least one interface or function (for example, a command) for file control, window control, image processing or character control.

According to various embodiments of the present disclosure, the application 134 may include a short message service (SMS)/multimedia messaging service (MMS) application, an e-mail application, a calendar application, an alarm application, a healthcare application (for example, an application for measuring an exercise volume or a blood sugar level), or an environment information application (for example, an application for providing air pressure, humidity, or temperature information). Additionally or alternatively, the application 134 may be an application associated with information exchange between the electronic device 101 and an external electronic device 104. The application associated with information exchange may include a notification relay application for relaying particular information to the external electronic device or a device management application for managing the external electronic device.

For example, the notification relay application may include a function of relaying notification information generated in another application (for example, the SMS/MMS application, the e-mail application, the healthcare management application, or the environment information application) of the electronic device 101 to the external electronic device 104. Additionally or alternatively, the notification relay application may, for example, receive notification information from the external electronic device 104 and provide the notification information to a user. The device management application may manage (for example, install, delete, or update) a function of at least a part of the external electronic device 104 communicating with the electronic device 101 (for example, turn-on/turn-off of the external electronic device (or a part thereof) or brightness (or resolution) adjustment of the display), an application operating on the external electronic device 104, or a service (for example, a call service or a message service) provided on the external electronic device 104.

According to various embodiments of the present disclosure, the application 134 may include an application designated according to an attribute (for example, a type) of the external electronic device 104. For example, if the external electronic device 104 is a digital audio player, the application 134 may include an application associated with music playback. Similarly, if the external electronic device 104 is a mobile medical device, the application 134 may include an application associated with healthcare. According to various embodiments of the present disclosure, the application 134 may include at least one of an application designated in the electronic device 101 and an application received from another electronic device (for example, the server 106 or the external electronic device 104).

The I/O interface 140 delivers a command or data input from a user through an input/output device (for example, a sensor, a keyboard, or a touch screen) to the processor 120, the memory 130, or the communication interface 160 through, for example, the bus 110. For example, the I/O interface 140 may provide data corresponding to a user's touch input through the touch screen to the processor 120. The I/O interface 140 may output a command or data, which is received from the processor 120, the memory 130, or the communication interface 160 through the bus 110, through an I/O device (for example, a speaker or a display). For example, the I/O interface 140 may output audio data processed through the processor 120 to the user through the speaker.

The display 150 may display various information (for example, multimedia data, text data, or the like) to users.

The communication interface 160 sets up communication, for example, between the electronic device 101 and an external device (for example, a first external electronic device 104 or a server 106). For example, the communication interface 160 is connected to a network 162 through wireless or wired communication to communicate with the external device 104.

The wireless communication may use at least one of Wi-Fi, Bluetooth (BT), near field communication (NFC), a GPS, or cellular communication (for example, long term evolution (LTE), LTE-advanced (LTE-A), code division multiple access (CDMA), wideband CDMA (WCDMA), a universal mobile telecommunication system (UMTS), wireless broadband (WiBro), or global system for mobile communications (GSM)). The wired communication may include, for example, at least one of a universal serial bus (USB), a high definition multimedia interface (HDMI), a recommended standard (RS)-232, and a plain old telephone service (POTS).

According to an embodiment of the present disclosure, the network 162 may be a telecommunications network. The communication network may include at least one of a computer network, the Internet, the Internet of things, and a telephone network. According to an embodiment of the present disclosure, a protocol (for example, a transport layer protocol, a data link layer protocol, or a physical layer protocol) for communication between the electronic device 101 and an external electronic device may be supported in at least one of the application 134, the API 133, the middleware 132, the kernel 131, and the communication interface 160.

The processor 120 processes at least a part of information obtained from other components (for example, the memory 130, the I/O interface 140, the communication interface 160, or the like), and provides the processed part of the information to a user in various ways. For example, the processor 120 controls at least some functions of the electronic device 101 such that the electronic device 101 interworks with another electronic device (for example, the electronic device 104 or the server 106). With reference to FIGS. 2 through 12, additional information about the processor 120 will be provided.

The processor 120 converts an image stored in the memory 130 of the electronic device 101 or an image input to the electronic device 101 to have a lower resolution than a resolution of the image. Hereinafter, converting the image to have a lower resolution than a resolution of the image will be referred to as "down-scaling". Once the image is scaled down, the processor 120 may process the down-scaled image from a high-resolution domain into a low-resolution domain. By encoding the image in this way, the processor 120 may reduce the amount of the image while minimizing deterioration of the image.

The processor 120 converts an image stored in the memory 130 or an image input to the electronic device 101 to have a higher resolution than a resolution of the image. Hereinafter, converting the image to have a higher resolution than a resolution of the image will be referred to as "up-scaling". Once the image is scaled up, the processor 120 processes the up-scaled image to a high-resolution domain.

As such, by performing image processing with respect to the original image, the processor 120 performs encoding with respect to the original image. The processor 120 decodes the encoded image to repair the image and provide the image to the user. In particular, the processor 120 encodes the image by using a side channel between two channels for image processing (for example, a main channel and the side channel), thereby minimizing the rate of deterioration of the image. The main channel indicates the image itself, and main channel encoding may indicate, for example, enlargement, reduction, color change of the image, and so forth. The side channel indicates information about the image and may include, for example, a pixel-specific color value, the size of the image, and the like.

The processor 120 encodes the image by using the side channel. In the following description, encoding using the side channel will be referred to as "side-channel encoding". The processor 120 also generates information about a way used to encode the image or a way to decode the encoded image (hereinafter, referred to as side channel information) and includes the generated information in the encoded image, during side-channel encoding of the image. According to an embodiment of the present disclosure, the processor 120 may transmit the side-channel-encoded image to another electronic device (for example, the electronic device 104) through the communication interface 160.

The processor 120 decodes the side-channel-encoded image. The processor 120 decodes the encoded image based on the side channel information included in the side-channel-encoded image. The image to be decoded may have been side-channel-encoded by another electronic device (for example, the electronic device 104).

Figure 2:
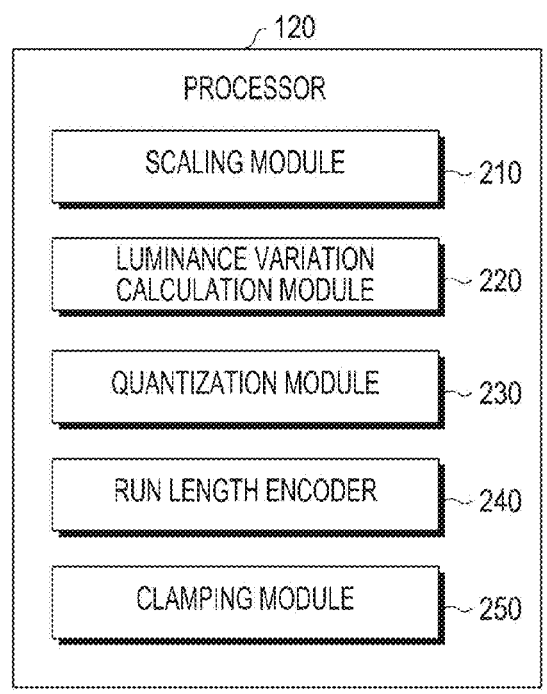
FIG. 2 is a block diagram of a control module of an electronic device according to various embodiments of the present disclosure.

FIG. 2 is a block diagram of the processor 120 of an electronic device (for example, the electronic device 101) according to various embodiments of the present disclosure.

Referring to FIG. 2, the processor 120 may include one or more of a scaling module 210, a luminance variation calculation module 220, a quantization module 230, a run length encoder 240, and a clamping module 250.

The scaling module 210 performs down-scaling or up-scaling with respect to the image. Down-scaling involves converting, for example, an image having a resolution of 3000×2000 to have a lower resolution of 750×500 or an image having a resolution of 1920×1080 to have a lower resolution of 960×540. According to an embodiment, the scaling module 210 may reduce four pixels of 2×2 pixels forming a square into one pixel. In the following description, the down-scaled image will be referred to as a "down image". Up-scaling involves converting, for example, an image having a resolution of 750×500 to have a higher resolution of 3000×2000 or an image having a resolution of 960×540 to have a higher resolution of 1920×1080. According to an embodiment, the scaling module 210 may enlarge the image to 2×2 pixels forming one pixel. In the following description, the up-scaled image will be referred to as an "up image". The image which has not yet been side-channel-encoded by the processor 120 will be referred to as an "original image".

For example, the scaling module 210 may perform down-scaling with respect to the original image by performing box filtering using a 2×2 matrix as below. According to an embodiment of the present disclosure, the scaling module 210 may down-scale the original image by using an algorithm other than the 2×2 box filtering.

For example, the scaling module 210 may perform up-scaling by performing 4×4 cubic interpolation with respect to the original image by using the following four 4×4 matrices. According to an embodiment of the present disclosure, the scaling module 210 may up-scale the original image according to an algorithm that is finer than the 4×4 cubic interpolation or a linear interpolation algorithm that is simpler than 4×4 cubic interpolation.

The luminance variation calculation module 220 may calculate a local average luminance or a luminance variation. According to an embodiment of the present disclosure, the luminance variation calculation module 220 may calculate a pixel-specific luminance variation ΔL by using Equation 1:

$$\Delta L = \frac{W_R(r_i - \bar{r}) + W_G(g_i - \bar{g}) + W_B(b_i - \bar{b})}{W_R + W_G + W_B} \quad \text{Equation 1}$$

where, for example, $(W_R, W_G, W_B)=(2, 5, 1)$, $(r_i, g_i, b_i)$ indicates input color coordinates, and $(\bar{r}, \bar{g}, \bar{b})$ indicates local average reference values. According to an embodiment of the present disclosure, $(\bar{r}, \bar{g}, \bar{b})$ may be cubic-interpolated values.

The quantization module 230 quantizes a pixel-specific luminance variation calculated by the luminance variation calculation module 220. That is, the quantization module 230 converts the luminance variation into a first variation binary signal.

According to an embodiment of the present disclosure, the quantization module 230 performs a side channel operation with respect to the first variation binary signal to reduce a length of the first variation binary signal into which the luminance variation is binarized. The side channel operation may be performed truncation or clamping. The first variation binary signal may have 1 sign bit and 8 magnitude bits. The quantization module 230 may adjust the magnitude bits of the first variation binary signal to be simpler through clamping or truncation.

The quantization module 230 simplifies the side channel information, that is, the first variation binary signal, through the side channel operation, thereby reducing the size of the first variation binary signal and thus reducing a bandwidth of a side channel of the image. For example, assuming that 8 magnitude bits of the first variation binary signal are "10110101", then the quantization module 230 may simplify "10110101" into "10111111" or "10110000". In the following description, a signal simplifying the first variation binary signal with truncation or clamping will be referred to as a "second variation binary signal".

The run length encoder 240 may reduce the size of the side channel information by compressing second variation binary signals per pixel of the image. For example, assuming that there are in the image, 100 pixels for which the second variation binary signal is "1011", the run length encoder 240 may include "100×1011" in the side channel information, thus compressing the second variation binary signals for all the 100 pixels. By compressing the second variation binary signals in this way, the run length encoder 240 may indicate that the second variation binary signal for all the 100 pixels is "1011".

According to an embodiment of the present disclosure, the second variation binary signal may be output in a state of not being compressed by the run length encoder 240.

The clamping module 250 may force the first variation binary signal to 0 or 255 such that magnitude bits of the first variation binary signal binarized by the quantization module 230, except for the sign bit, are not less than 0 or do not exceed 255.

According to an embodiment of the present disclosure, the processor 120 may further include an error correction module (not shown). The error correction module may correct an error of a signal, a pixel-specific luminance variation is encoded by the scaling module 210, the luminance variation calculation module 220, the quantization module 230, the run length encoder 240, or the clamping module 250. The error correction module may also correct an error of a signal that may be generated during decoding of the encoded signal.

In accordance with an aspect of the present disclosure, there is provided a method for encoding an image, the method including converting an original image into a down image by downscaling the original image, converting the down image into an up image by upscaling the down image, calculating a pixel-specific luminance variation between the original image and the up image by using a local average luminance for each pixel included in the original image, converting the pixel-specific luminance variation into a first variation binary signal by binarizing the luminance variation, converting the first variation binary signal into a second variation binary signal by simplifying the first variation binary signal, and outputting the second variation binary signal by including the second variation binary signal in the down image.

Figure 3:
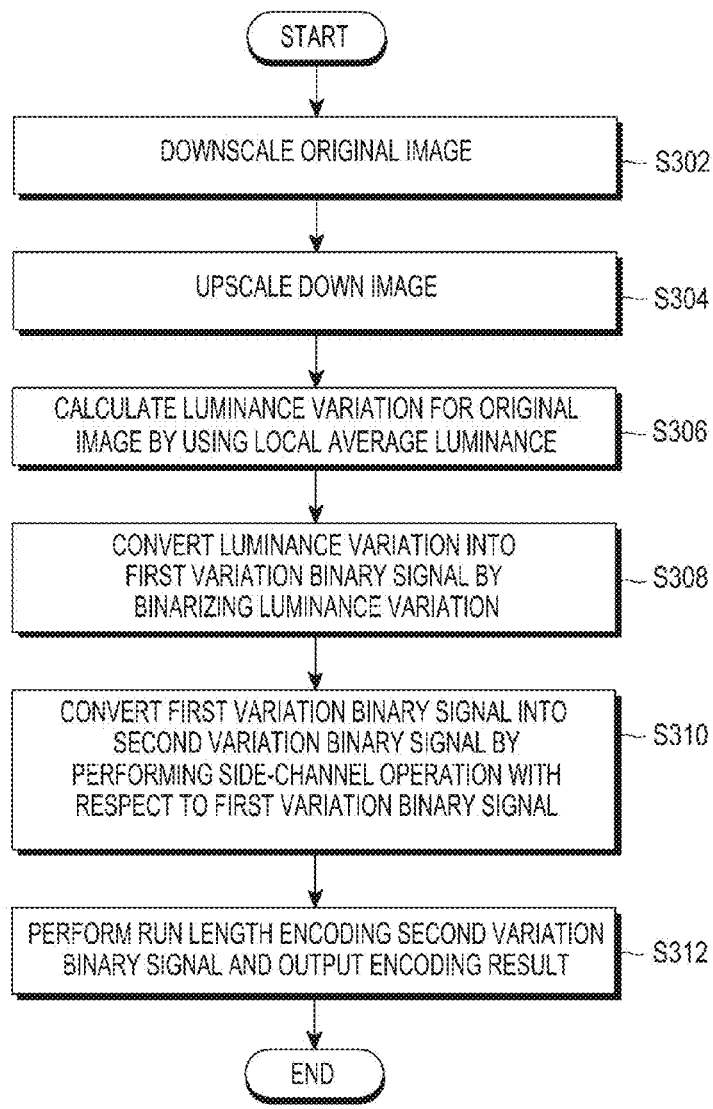
FIG. 3 is a flowchart illustrating a side-channel encoding method of an electronic device according to various embodiments of the present disclosure.

FIG. 3 is a flowchart illustrating a side-channel encoding method for an electronic device according to various embodiments of the present disclosure.

Referring to FIG. 3, the scaling module 210 of the processor 120 down-scales the original image in operation S302. The scaling module 210 converts the original image into a low-resolution image by down-scaling the original image. In this way, the scaling module 210 converts the original image into the down image in operation S302.

According to an embodiment of the present disclosure, the luminance variation calculation module 220 of the processor 120 may calculate an average luminance of each pixel included in the down image and pixels adjacent to each pixel (neighboring pixels) in operation S302. For example, the luminance variation calculation module 220 may calculate an average luminance in a set of 3×3 pixels. The calculated average luminance will be referred to as a "local average luminance".

The scaling module 210 up-scales the down-scaled original image in operation S302, that is, the down image, in operation S304. The up-scaling operation of operation S304 may be performed to additionally interpolate the local average luminance, and according to an embodiment of the present disclosure, may be omitted under control of the processor 120. As such, in operation S304, the scaling module 210 may convert the down image into an up image by upscaling the down image.

The processor 120 may calculate the local average luminance by using the up image output to the scaling module 210 in operation S304. The up image corresponds to a result of upscaling the downscaled original image, that is, the down image, to the original size, and thus the local average luminance of the up image may be the same as the local average luminance of the down image.

The luminance variation calculation module 220 calculates a luminance variation for the original image by using the average luminance in operation S306. The luminance variation calculation module 220 calculates a luminance variation for each pixel included in the original image by using a luminance value of each pixel included in the original image and a luminance value of each pixel included in an image processed by the scaling module 210, for example, a result of downscaling the original image and then upscaling the downscaled original image by the scaling module 210, that is, the up image.

If the luminance variation is calculated for each pixel included in the original image, the quantization module 230 converts the luminance variation into a first variation binary signal by binarizing the luminance variation in operation S308. Thus, the pixel-specific luminance variation may be expressed as a binary signal. The first variation binary signal converted in operation S308 may include 1 sign bit and 8 magnitude bits.

The quantization module 230 then performs the side channel operation with respect to the first variation binary signal to simplify the first variation binary signal into a second variation binary signal in operation S310. In operation S310, for example, the quantization module 230 may change lower 4 bits of the magnitude bits (8 bits) of the first variation binary signal into "0000", thus converting the first variation binary signal into the second variation binary signal.

If the side channel operation is completed, the run length encoder 240 performs run length encoding with respect to the second variation binary signal and outputs the result in operation S312. Thus, the processor 120 may reduce the length of the second variation binary signal, for example, from 9 bits to 5 bits.

Figure 4:
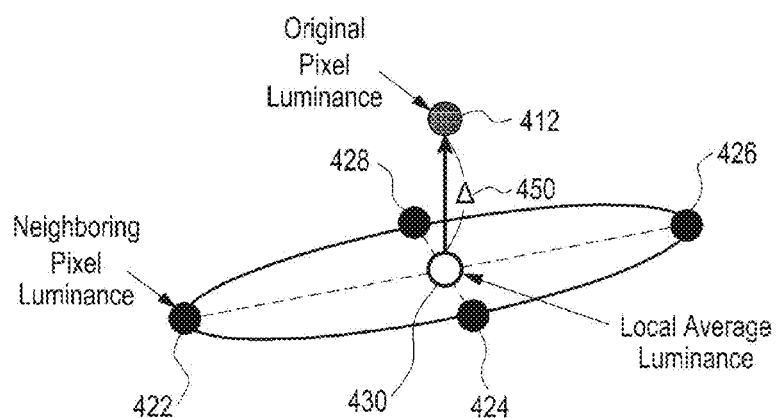
FIG. 4 illustrates an example of obtaining a luminance variation for an image by an electronic device according to various embodiments of the present disclosure.

FIG. 4 illustrates an example of obtaining a luminance variation for an image by an electronic device according to various embodiments of the present disclosure.

The luminance variation calculation module 220 calculates a pixel-specific luminance variation for the original image by using a luminance value of each pixel included in the original image and a luminance value of each pixel included in an image converted by the scaling module 210, that is, a result of downscaling the original image and then upscaling the downscaled original image by the scaling module 210, that is, the up image.

Referring to FIG. 4, a luminance value in the original image, that is, an original luminance value 412, may correspond to each pixel included in the original image. To each pixel, luminance values 422, 424, 426, and 428 of neighboring pixels adjacent to each pixel and a local average luminance value 430 calculated based on the luminance values 422, 424, 426, and 428 of the neighboring pixels may correspond. The luminance values 422, 424, 426, and 428 of the neighboring pixels may be luminance values in the original image.

The luminance variation calculation module 220 may calculate a difference between a luminance value of a pixel in the original image, that is, the original luminance value 412, and the local average luminance value 430 as a luminance variation 450 for the pixel.

Figure 5:
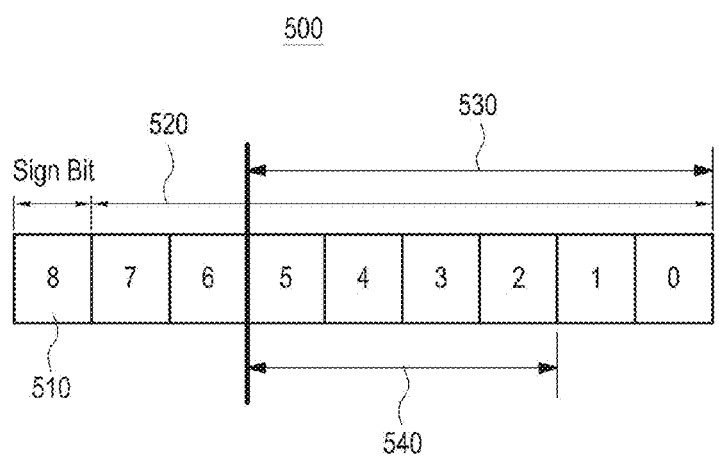
FIG. 5 is a diagram illustrating a first variation binary signal in which a luminance variation is binarized according to various embodiments of the present disclosure.

FIG. 5 is a diagram illustrating a first variation binary signal in which a luminance variation is binarized according to various embodiments of the present disclosure.

Referring to FIG. 5, a first variation binary signal 500 may include 1 sign bit 510 and 8 magnitude bits 520. As mentioned above, to reduce a bit depth of the first variation binary signal 500, clamping and truncation may be used. Clamping may involve filling a value of a last significant bit (LSB) in bits 530 including, for example, first through sixth bits from bottom among the magnitude bits 520. For example, assuming that the first variation binary signal 500 is "111110010", the quantization module 230 may determine 0 for values of the bits 530 illustrated in FIG. 5 because the value of the LSB is 0. As a result, the first variation binary signal 500 may be converted into "111110000" by the quantization module 230. As such, "111110000" into which the first variation binary signal 500 is converted corresponds to a second variation binary signal.

Truncation may involve filling a value of a most significant bit (MSB) in, for example, a particular range of the magnitude bits 520, for example, bits 540 including third through sixth bits. For example, assuming the first variation binary signal 500 is "111110010" the quantization module 230 may determine 1 for values of the bits 540 illustrated in FIG. 5 because the value of the MSB is 1. As a result, the first variation binary signal 500 may be converted into "111111111" by the quantization module 230. As such, "111111111" into which the first variation binary signal 500 is converted corresponds to the second variation binary signal.

Figure 6:
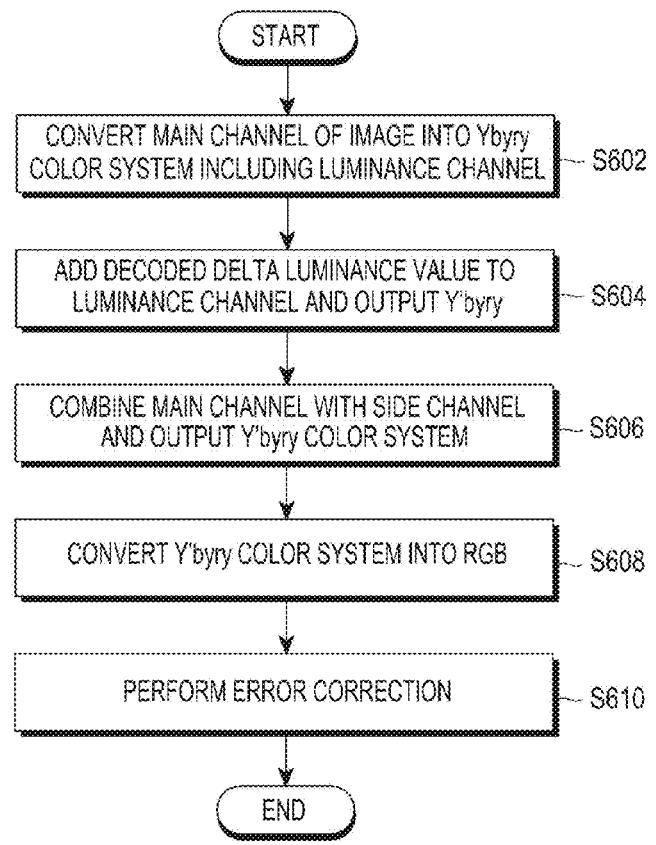
FIG. 6 is a flowchart illustrating a side channel decoding method for an electronic device according to various embodiments of the present disclosure.

FIG. 6 is a flowchart illustrating a side channel decoding method for an electronic device according to various embodiments of the present disclosure. In FIG. 6, the electronic device 101 is assumed to receive an image encoded according to side-channel encoding as illustrated in FIG. 3. It is assumed that in FIG. 6, the electronic device 101 receives, from another electronic device (for example, the electronic device 104), an image which is a result of ¼ downscaling the original image and then 4 times upscaling the downscaled original image to have the same resolution as the original image.

Referring to FIG. 6, the processor 120 converts a main channel of the image from a red, green, blue (RGB) color system into an Ybyry color system in operation S602. That is, in operation S602, the processor 120 may convert the RGB color of the image into the Ybyry color. In this case, the processor 120 may convert the RGB color system into the Ybyry color system using Equation 2:

$$Y=(r+2g+b)/4 \quad R=Y+Ry$$

$$By=b-Y \quad G=Y-(By/2+Ry/2)$$

$$Ry=r-Y \quad B=Y+By \qquad \text{Equation 2}$$

According to an embodiment of the present disclosure, the scaling module 210 of the processor 120 may scale up the image of the RGB color system prior to operation S602. According to an embodiment of the present disclosure, after operation S602, the scaling module 210 may scale up the image of the Ybyry color system after operation S602.

By converting the main channel from the RGB color system into the Ybyry color system, the processor 120 obtains a luminance channel luma (Y) separated from chroma channels in the Ybyry color system. The luminance channel may be assumed to be the Ybyry color system. According to an embodiment of the present disclosure, the processor 120 decodes the side channel information included in the image after operation 5604, thus obtaining a pixel-specific luminance variation included in the image.

The processor 120 adds the decoded luminance variation luma(Y) to the luminance channel Ybyry and outputs the Y'byry color system in operation 5604. Operation 5604 may be performed by adding the luminance variation luma(Y) to an up image, which is a result of upscaling a down image obtained by ¼ downscaling the original image by the processor 120. The processor 120 may combine the main channel with the side channel and outputs Y'byry color system in operation S606. In operation S606, the processor 120 may repair the original image to a display quality that is similar with that of the original image by using the luminance variation luma(Y), that is, a luminance variation between the up image and the original image.

The processor 120 converts the Y'byry color system into the RGB color system in operation S608 and corrects an error that may occur in operations S602 through S608 in operation S610. In operation S610, the clamping module 250 of the processor 120 may fix the magnitude bit of the first variation binary signal to 0 or 255 by using clamping.

In accordance with an aspect of the present disclosure, there is provided an electronic device for performing side-channel encoding an image, the electronic device including a memory configured to store an original image; and a processor configured to: convert the original image into a down image by downscaling the original image, convert the down image into an up image by upscaling the down image, calculate a pixel-specific luminance variation between the original image and the up image by using a local average luminance for each pixel included in the original image, convert the luminance variation into a first variation binary signal by binarizing the luminance variation, convert the first variation binary signal into a second variation binary signal by simplifying the first variation binary signal, and output the second variation binary signal by including the second variation binary signal in the down image.

FIGS. 7A to 7C, 8A to 8C, 9A to 9C, and 10A to 10C illustrate images encoded according to various embodiments of the present disclosure.

FIG. 7A illustrates the original image, FIG. 7B illustrates a cubic-interpolated image of the original image, and FIG. 7C illustrates an image obtained by cubic-interpolating and at the same time, side-channel encoding the original image.

The image of FIG. 7B may be a 4×4 cubic-interpolated image of, for example, the original image of FIG. 7A. If the size of the original image of FIG. 7A is 100, the size of the image of FIG. 7B may be 23. The size of the image of FIG. 7C, obtained by cubic-interpolating and side-channel encoding the original image (a), may be 36. As such, if side-channel encoding is performed, the size of the image is increased when compared to a case where side-channel encoding is not performed, without causing display quality deterioration, such that an image of a display quality that is similar to that of the original image may be provided to the user.

FIG. 8A indicates the original image, FIG. 8B indicates a cubic-interpolated image of the original image, and FIG. 8C indicates an image obtained by cubic-interpolating and at the same time, side-channel encoding the original image.

The image of FIG. 8B may be a 4×4 cubic-interpolated image of the original image of FIG. 8A. If the size of the original image of FIG. 8A is 100, the size of the image of FIG. 8B may be 10. The size of the image of FIG. 8C, obtained by cubic-interpolating and at the same time, side-channel encoding the original image of FIG. 8A, may be 20. As such, if side-channel encoding is performed, the size of the image is increased when compared to a case where side-channel encoding is not performed, without causing display quality deterioration, such that an image of a display quality that is similar to that of the original image may be provided to the user.

FIG. 9A indicates the original image, FIG. 9B indicates a cubic-interpolated image of the original image, and FIG. 9C indicates an image obtained by cubic-interpolating and at the same time, side-channel encoding the original image.

The image of FIG. 9B may be a 4×4 cubic-interpolated image of the original image of FIG. 9A. If the size of the original image of FIG. 9A is 100, the size of the image of FIG. 9B may be 26. The size of the image of FIG. 9C, obtained by cubic-interpolating and at the same time, side-channel encoding the original image of FIG. 9A, may be 36. As such, if side-channel encoding is performed, the size of the image is increased when compared to a case where side-channel encoding is not performed, without causing display quality deterioration, such that an image of a display quality that is similar to that of the original image may be provided to the user.

FIG. 10A indicates the original image, of FIG. 10B indicates a cubic-interpolated image of the original image, and of FIG. 10C indicates an image obtained by cubic-interpolating and at the same time, side-channel encoding the original image.

The image of FIG. 10B may be a 4×4 cubic-interpolated image of the original image of FIG. 10A. If the size of the original image of FIG. 10A is 100, the size of the image of FIG. 10B may be 24. The size of the image of FIG. 10C, obtained by cubic-interpolating and at the same time, side-channel encoding the original image of FIG. 10A, may be 34. As such, if side-channel encoding is performed, the size of the image is increased when compared to a case where side-channel encoding is not performed, without causing display quality deterioration, such that an image of a display quality that is similar to that of the original image may be provided to the user.

Figure 11A:
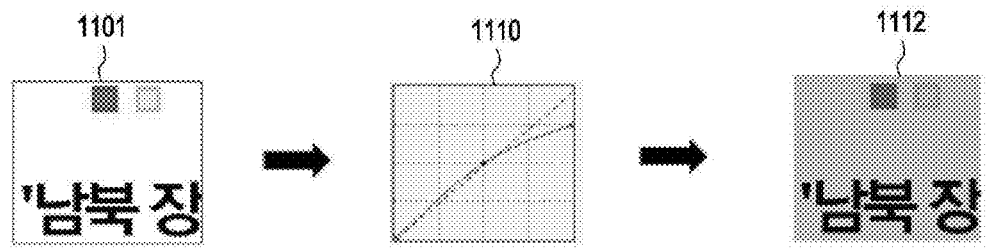
FIGS. 11A, 11B, and 11C illustrate images encoded according to various embodiments of the present disclosure.
Figure 11B:
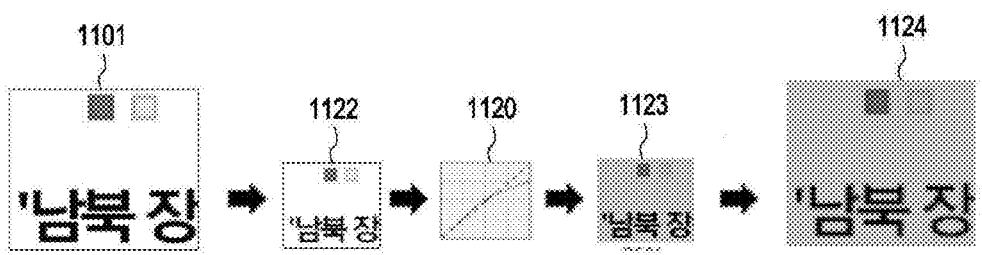
Figure 11C:
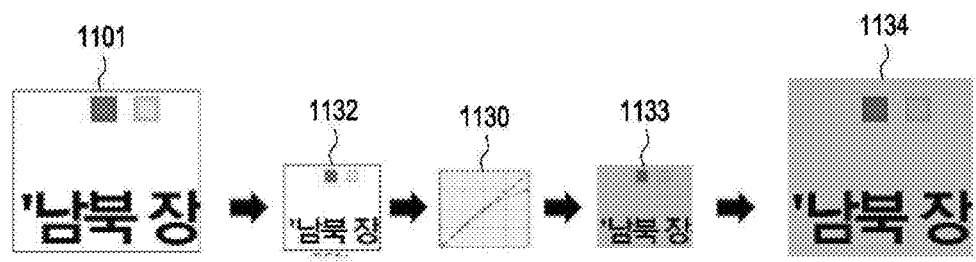

FIGS. 11A to 11C illustrate images encoded according to various embodiments of the present disclosure.

Referring to FIGS. 11A to 11C, a first image 1101, which is the original image, is an image having a black text in a white background and may be a text-oriented image.

FIG. 11A illustrates the first image 1101, which is the original image, and a result of performing main processing, for example, high-resolution tone mapping 1110, on the first image 1101, that is, a second image 1112 converted from the first image 1101. High-resolution tone mapping 1110 may be intended to change the background color of the first image 1101 that is the original image from white to gray. The high-resolution tone mapped image has a gray background color like the second image 1112, but a user who sees the image through the display 150 displaying the high-resolution tone mapped image may perceive the background color of the high-resolution tone mapped image as white.

The second image 1112 of FIG. 11A has been obtained by performing high-resolution tone mapping 1110 with respect to the first image 1101 while maintaining the resolution of the first image 1101. Thus, the second image 1112 may have only a changed background color, that is, the gray color, while maintaining the resolution of the first image 1101 without display quality deterioration.

FIG. 11B illustrates a fourth image 1124 obtained by downscaling the original image, the first image 1101, into a second image 1122, performing high-resolution tone mapping 1120 with respect to the second image 1122 to convert the second image 1122 into a third image 1123, and then upscaling the third image 1123.

Downscaling with respect to the first image 1101 may be, for example, ¼ scaling, and the resolution of the second image 1122 in FIG. 11B is assumed to be ¼ of the resolution of the first image 1101, which is the original image. The third image 1123 has been obtained by performing high-resolution tone mapping 1120 with respect to the second image 1122 while maintaining the resolution of the second image 1122. A fourth image 1124 has been obtained by upscaling the third image 1123 such that the resolution of the fourth image 1124 is the same as the first image 1101 that is the original image. The fourth image 1124 is an image obtained by simply upscaling the third image 1123 to increase the resolution of the third image 1123 four times. As can be seen from FIG. 11B, the fourth image 1124 obtained by simply upscaling the third image 1123 maintains the same effect as high-resolution tone mapping 1120, but has display quality deterioration unlike in the third image 1123.

FIG. 11C illustrates a fourth image 1134 obtained by downscaling the first image 1101, which is the original image, into a second image 1132, performing high-resolution tone mapping 1130 with respect to the second image 1132 to convert the second image 1132 into the third image 1133, and then upscaling and at the same time, side channel decoding the third image 1133 to convert the third image 1133 into the fourth image 1134.

Downscaling with respect to the first image 1101 may be, for example, ¼ scaling, and the resolution of the second image 1132 in FIG. 11C is assumed to be ¼ of the resolution of the first image 1101 that is the original image. Although not shown in FIG. 11C, the electronic device 101 may perform side-channel encoding with respect to the first image 1101 simultaneously with downscaling the first image 1101. Referring to FIG. 11C, a result of performing side-channel encoding with respect to the first image 1101, the original image, is not illustrated.

The third image 1133 has been obtained by performing high-resolution tone mapping 1130 with respect to the second image 1132 while maintaining the resolution of the second image 1132, such that the third image 1133 may have a gray background color unlike the second image 1132. The fourth image 1134 has been obtained by upscaling and at the same time, side channel decoding the third image 1133. Since the third image 1133 on which high-resolution tone mapping 1130 has been performed is side-channel decoded and at the same time, scaled up, the fourth image 1134 may have the gray background color as the effect of the high-resolution tone mapping 1130 and may not have display quality deterioration that may be caused by upscaling.

Figure 12A:
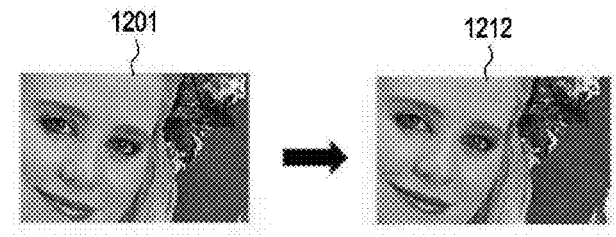
FIGS. 12A, 12B, and 12C illustrate images encoded according to various embodiments of the present disclosure.
Figure 12B:
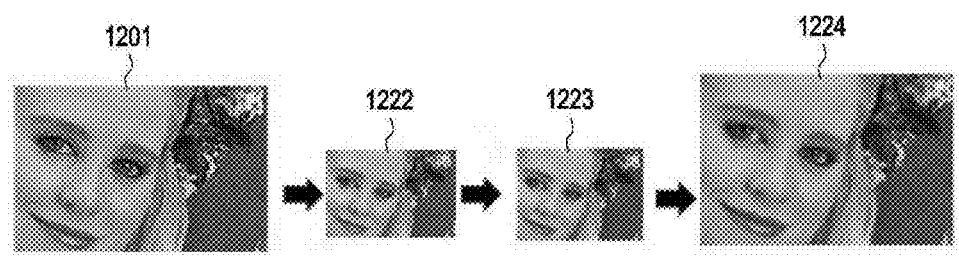
Figure 12C:
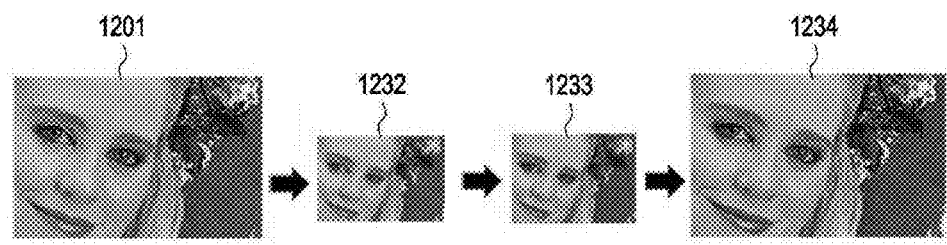

FIGS. 12A to 12C illustrate images encoded according to various embodiments of the present disclosure.

Referring to FIGS. 12A to 12C, a first image 1201 is the original image, for example, a picture of a person or an object.

FIG. 12A illustrates the first image 1201 and a result of performing main channel processing, for example, high-resolution saturation enhancement, on the first image 1201, that is, a second image 1212 converted from the first image 1201. In particular, the second image 1212 of FIG. 12A is obtained by performing high-resolution saturation enhancement while maintaining the resolution of the first image 1201. High-resolution saturation enhancement may be intended to make the image clear by changing a color of the image. As the effect of high-resolution saturation enhancement, the second image 1212 may have a clearer display quality than the original image, the first image 1201.

Referring to FIG. 12A, the second image 1212 may have no display quality deterioration because it has been obtained by high-resolution saturation enhancement while maintaining the resolution of the first image 1201.

FIG. 12B illustrates a fourth image 1224, which has been obtained by downscaling the original image, the first image 1201, into a second image 1222, performing high-resolution saturation enhancement with respect to the second image 1222 to convert the second image 1222 into a third image 1223, and upscaling the third image 1223.

Downscaling with respect to the first image 1201 may be, for example, ¼ scaling, and the resolution of the second image 1222 in FIG. 12B is assumed to be ¼ of the resolution of the original image, the first image 1201. The third image 1223 has been obtained by performing high-resolution saturation enhancement with respect to the second image 1222 while maintaining the resolution of the second image 1222. Thus, the third image 1223 may be clearer than the second image 1222. The fourth image 1224 has been obtained by upscaling the third image 1223 to have the same resolution as that of the first image 1201, the original image. The fourth image 1224 is an image obtained by simply upscaling the third image 1223 to increase the resolution of the third image 1223 four times. As can be seen from FIG. 12B, the fourth image 1224 obtained by simply upscaling the third image 1223 maintains the same effect as high-resolution saturation enhancement, but has display quality deterioration unlike in the third image 1223.

FIG. 12C illustrates a fourth image 1234, which has been obtained by downscaling the original image, the first image 1201, into a second image 1232, performing high-resolution saturation enhancement with respect to the second image 1232 to convert the second image 1232 into a third image 1233, and upscaling and side-channel decoding the third image 1233.

Downscaling with respect to the first image 1201 may be, for example, ¼ scaling, and the resolution of the second image 1232 in FIG. 12C is assumed to be ¼ of the resolution of the first image 1201, the original image. Although not shown in FIG. 12C, the electronic device 101 may perform downscaling and at the same time, side-channel encoding the first image 1201. Referring to FIG. 12C, a result of side-channel encoding the original image, the first image 1201 is not illustrated.

The third image 1233 has been obtained by performing high-resolution saturation enhancement with respect to the second image 1232 while maintaining the resolution of the second image 1232, such that the third image 1233 may be displayed in a clearer color than the second image 1232. The fourth image 1234 is a result of upscaling and at the same time, side channel decoding the third image 1233. The fourth image 1234 may maintain clear display quality as the effect of high-resolution saturation enhancement without display quality deterioration that may be caused by upscaling, because the fourth image 1234 is obtained by side channel decoding, while upscaling, the third image 1233 on which high-resolution saturation enhancement has been performed.

Figure 13:
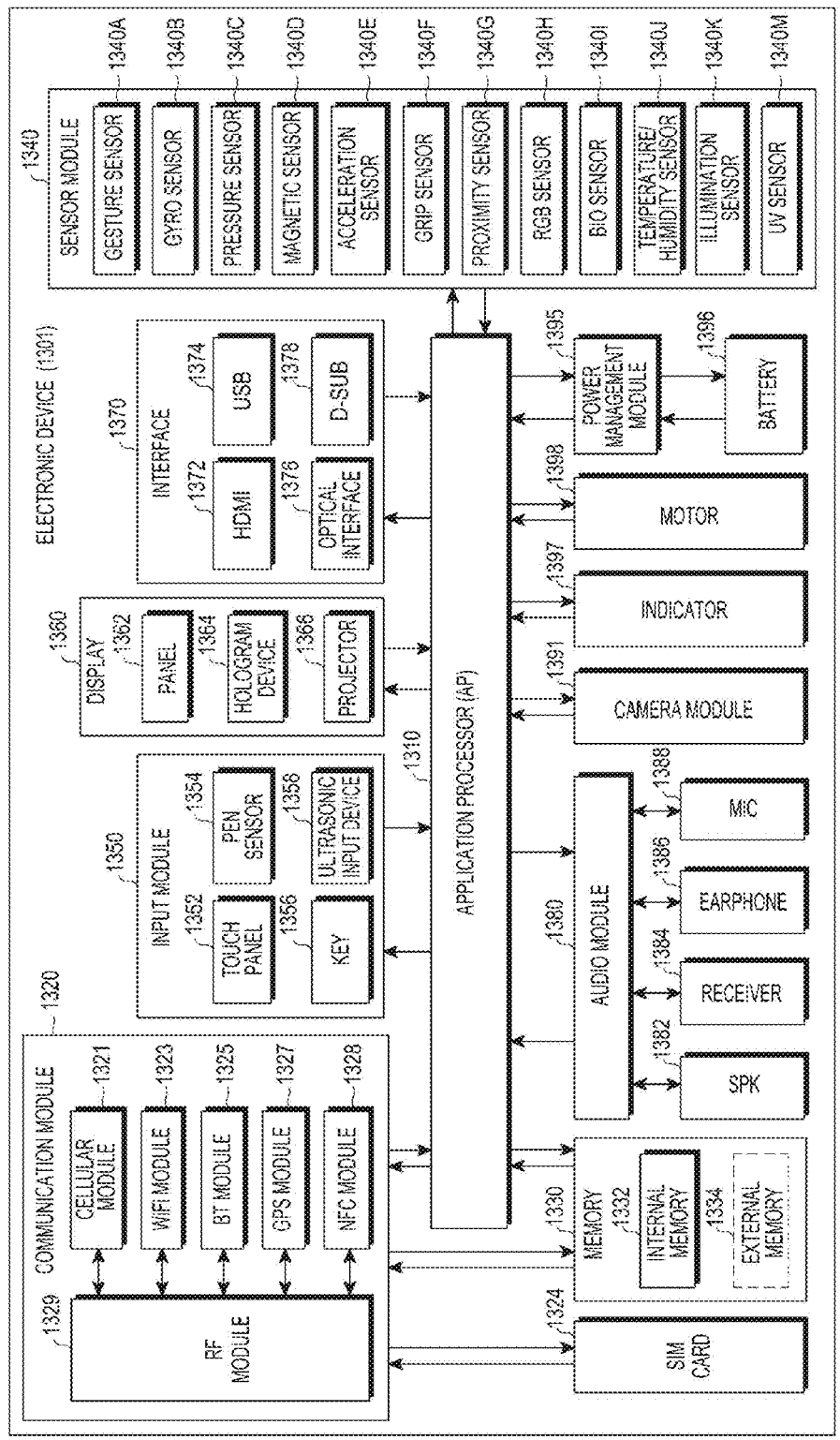
FIG. 13 is a block diagram of an electronic device according to various embodiments of the present disclosure.

FIG. 13 is a block diagram of an electronic device 1301 according to various embodiments of the present disclosure. The electronic device 1301 may form, for example, the entire electronic device 101 illustrated in FIG. 1 or a part thereof.

Referring to FIG. 13, an electronic device 1301 may include one or more application processors (APs) 1310, a communication module 1320, a subscriber identification module (SIM) card 1324, a memory 1330, a sensor module 1340, an input device 1350, a display 1360, an interface 1370, an audio module 1380, a camera module 1391, a power management module 1395, a battery 1396, an indicator 1397, and a motor 1398.

The AP 1310 may control multiple hardware or software components connected to the AP 1310 by driving an operating system (OS) or an application program, and may process various data including multimedia data and perform operations. The AP 1310 may be implemented by, for example, a system on chip (SoC). According to an embodiment of the present disclosure, the AP 1310 may further include a graphics processing unit (GPU) (not illustrated).

The communication module 1320 (for example, the communication interface 160) may perform data transmission/reception in communication between the electronic device 1301 (for example, the electronic device 101) and other electronic devices (for example, the electronic device 104 or the server 106) connected through the network. According to an embodiment of the present disclosure, the communication module 1320 may include at least one of a cellular module 1321, a Wi-Fi module 1323, a BT module 1325, a GPS module 1327, an NFC module 1328, and a radio frequency (RF) module 1329.

The cellular module 1321 provides at least one of voice communication, video communication, a messaging service, and an Internet service through a communication network (for example, LTE, LTE-A, CDMA, WCDMA, UMTS, WiBro, GSM, or the like). The cellular module 1321 may identify and authenticate an electronic device in a communication network by using a SIM (for example, the SIM card 1324). According to an embodiment of the present disclosure, the cellular module 1321 performs at least some of functions provided by the AP 1310. For example, the cellular module 1321 may perform at least a part of a multimedia control function.

According to an embodiment of the present disclosure, the cellular module 1321 may include a communication processor (CP). The cellular module 1321 may be implemented with, for example, an SoC. Although components such as the cellular module 1321 (for example, the CP), the memory 1330, or the power management module 1395 are illustrated as being separated from the AP 1310, the AP 1310 may be implemented to include at least some (for example, the cellular module 1321) of the foregoing components.

According to an embodiment of the present disclosure, the AP 1310 or the cellular module 1321 (for example, the CP) may load a command or data received from at least one of a nonvolatile memory connected thereto and other components to a volatile memory and process the received command or data. The AP 1310 or the cellular module 1321 may store data received from at least one of other components or data generated by at least one of other components in the nonvolatile memory.

Each of the Wi-Fi module 1323, the BT module 1325, the GPS module 1327, and the NFC module 1328 may include a processor for processing data transmitted and received through the corresponding module. Although the cellular module 1321, the Wi-Fi module 1323, the BT module 1325, the GPS module 1327, and the NFC module 1328 are illustrated as separate blocks in FIGS. 8A to 8C, at least some (for example, two or more) of the cellular module 1321, the Wi-Fi module 1323, the BT module 1325, the GPS module 1327, and the NFC module 1328 may be included in one integrated circuit (IC) or IC package. For example, at least some of processors corresponding to the cellular module 1321, the Wi-Fi module 1323, the BT module 1325, the GPS module 1327, and the NFC module 1328 (for example, the CP 811 corresponding to the cellular module 1321 and a Wi-Fi processor corresponding to the Wi-Fi module 1323) may be implemented in one SoC.

The RF module 1329 may transmit and receive data, for example, an RF signal. The RF module 1329 may include, although not shown, at least one of a transceiver, a power amplification module (PAM), a frequency filter, and a low noise amplifier (LNA). The RF module 1329 may further include at least one of parts for transmitting and receiving electromagnetic waves on a free space, for example, a conductor and a conductive wire, in wireless communication. Although the cellular module 1321, the Wi-Fi module 1323, the BT module 1325, the GPS module 1327, and the NFC module 1328 are illustrated as sharing one RF module 1329 in FIGS. 8A to 8C, at least one of the cellular module 1321, the Wi-Fi module 1323, the BT module 1325, the GPS module 1327, and the NFC module 1328 may transmit and receive an RF signal through a separate RF module according to an embodiment of the present disclosure.

The SIM card 1324 may be a card including a SIM, and may be inserted into a slot formed in a particular position of the electronic device. The SIM card 1324 may include unique identification information (for example, an IC card identifier (ICCID)) or subscriber information (for example, an international mobile subscriber identity (IMSI)).

The memory 1330 (for example, the memory 120) may include an internal memory 1332 or an external memory 1334. The internal memory 1332 may include at least one selected from among a volatile memory (for example, a dynamic random access memory (DRAM), a static RAM (SRAM), a synchronous DRAM (SDRAM), or the like) and a nonvolatile memory (for example, one time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like).

According to an embodiment of the present disclosure, the internal memory 1332 may be a solid state drive (SSD). The external memory 1334 may further include a flash drive, for example, at least one of a compact flash, secure digital (SD), micro-SD, mini-SD, extreme digital (xD), and a memory stick. The external memory 1334 may be functionally connected with the electronic device 1700 through various interfaces. According to an embodiment of the present disclosure, the electronic device 1301 may further include a storage device (or storage medium) such as a hard drive.

The sensor module 1340 measures a physical quantity or senses an operation state of the electronic device 1700 to convert the measured or sensed information into an electric signal. The sensor module 1340 may include at least one selected from among a gesture sensor 1340A, a gyro sensor 1340B, a pressure sensor 1340C, a magnetic sensor 1340D, an acceleration sensor 1340E, a grip sensor 1340F, a proximity sensor 1340G, a color sensor 1340H (for example, RGB sensor), a bio sensor 1340I, a temperature/humidity sensor 1340J, an illumination sensor 1340K, an ultra violet (UV) sensor 1340M, and the like. Additionally or alternatively, the sensor module 1340 may include at least one selected from among an E-nose sensor (not illustrated), an electromyography (EMG) sensor (not illustrated), an electroencephalogram (EEG) sensor (not illustrated), an electrocardiogram (EGC) sensor (not illustrated), an infrared (IR) sensor (not illustrated), an iris sensor (not illustrated), a fingerprint sensor (not illustrated), and the like. The sensor module 1340 may further include a control circuit for controlling at least one sensors included therein.

The input device 1350 may include a touch panel 1352, a (digital) pen sensor 1354, a key 1356, or an ultrasonic input device 1358. The touch panel 1352 may recognize a touch input by using at least one of a capacitive, a resistive, IR, or ultrasonic scheme. The touch panel 1352 may further include a control circuit. For the capacitive touch panel 1352, recognition of a physical contact or approach is possible. The touch panel 1352 may further include a tactile layer. In this case, the touch panel 1352 may provide tactile reaction to a user.

The (digital) pen sensor 1354 may be implemented using a method that is the same as or similar to a user's touch input or by using a separate recognition sheet. The key 1356 may include a physical button, an optical key, or a keypad. The ultrasonic input device 1358 is a device that allows the electronic device 1301 to sense ultrasonic waves, input using an input means that generates an ultrasonic signal, through a microphone (for example, a microphone 1388), and to check data. The ultrasonic input device 1358 is capable of performing wireless recognition. According to an embodiment of the present disclosure, the electronic device 1301 may receive a user input from an external electronic device (for example, a computer or a server) connected thereto by using the communication module 1320.

The display 1360 (for example, the display 150) may include a panel 1362, a hologram device 1364, or a projector 1366. The panel 1362 may be, for example, a liquid crystal display (LCD), an active-matrix organic light-emitting diode (OLED), or the like. The panel 1362 may be implemented as being flexible, transparent, or wearable. The panel 1362 may be implemented with the touch panel 1352 as one module. The hologram device 1364 may show a stereoscopic image in the air by using interference of light. The projector 1366 may project light onto the screen to display an image. The screen may be positioned inside or outside the electronic device 1301. According to an embodiment, the display 1360 may further include a control circuit for controlling the panel 1362, the hologram device 1364, or the projector 1366.

The interface 1370 may include an HDMI 1372, a USB 1374, an optical interface 1376, or a D-subminiature 1378. The interface 1370 may be included in the communication interface 160 illustrated in FIG. 4. Additionally or alternatively, the interface 1370 may include a mobile high-definition link (MHL) interface, an SD card/multimedia card (MMC) interface, or an infrared data association (IrDA) standard interface.

The audio module 1380 bi-directionally converts sound and an electric signal. At least some components of the audio module 1380 may be included in the I/O interface 140 illustrated in FIG. 4. The audio module 1380 may process sound information input or output through at least one of a speaker 1382, a receiver 1384, an earphone 1386, and the microphone 1388.

The camera module 1391 is a device capable of capturing still and moving images, and according to an embodiment of the present disclosure, the camera module 1391 may include one or more image sensors (for example, a front sensor or a rear sensor), a lens (not illustrated), an image signal processor (ISP, not illustrated), or a flash (not illustrated, for example, an LED or a xenon lamp).

The power management module 1395 may manage power of the electronic device 1301. Although not shown, a power management IC (PMIC), a charger IC, or a battery or fuel gauge may be included in the power management module 1395.

The PMIC may be mounted in, for example, an IC or an SoC semiconductor. The charging method may be classified into a wired type and a wireless type. The charger IC may charge a battery, and may prevent introduction of an overvoltage or over-current from a charger. According to an embodiment of the present disclosure, the charger IC may include a charger IC for at least one of a wired charging method and a wireless charging method. The wireless charging method may include, for example, a magnetic resonance method, a magnetic induction method, or an electromagnetic wave method, and an additional circuit for wireless charging, for example, a coil loop, a resonance circuit, or a rectifier may be added for the wireless charging method.

The battery gauge measures the remaining capacity of the battery 1396, and a voltage, a current, or a temperature of the battery 1396 during charging. The battery 1396 stores or produces electricity and supplies power to the electronic device 1700 by using the stored or produced electricity. The battery 1396 may include a rechargeable battery or a solar battery.

The indicator 1397 may display a particular state, for example, at least one of a booting state, a message state, and a charging state, of the electronic device 1301 or a part thereof (for example, the AP 810). The motor 1398 may convert an electric signal into mechanical vibration. Although not shown, a processing unit for supporting mobile TVs (for example, a GPU) may be included in the electronic device 101. The processing unit for supporting mobile TVs may process media data complying with, for example, digital multimedia broadcasting (DMB), digital video broadcasting (DVB), or media flow.

The foregoing components of the electronic device according to various embodiments of the present disclosure may include one or more components, and a name of a component may vary according to a type of the electronic device. The electronic device according to various embodiments of the present disclosure may include at least one of the foregoing components, and some of them may be omitted from the electronic device or other components may be further included in the electronic device. Also, some of the components of the electronic device according to various embodiments of the present disclosure may be combined into one entity to perform the same function as those of the components that have not been combined.

Figure 14:
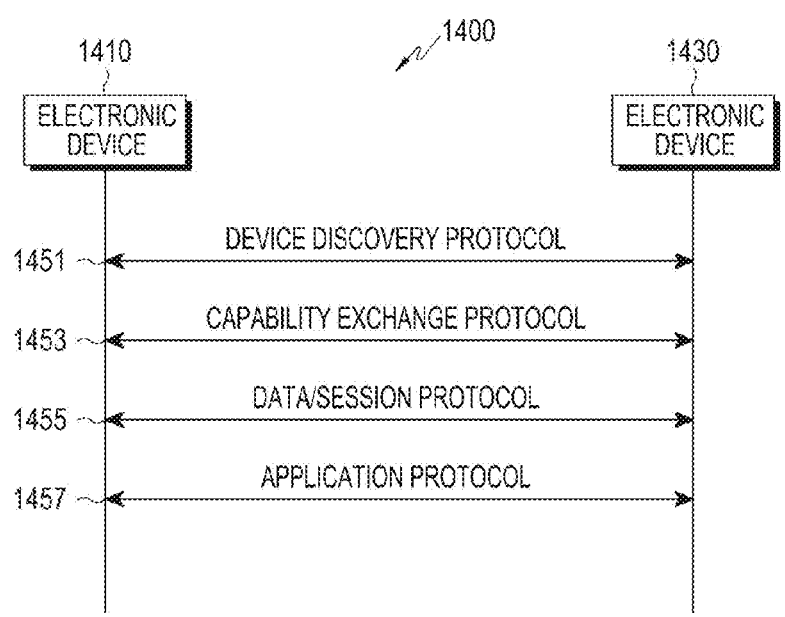
FIG. 14 illustrates a communication protocol between a plurality of electronic devices according to various embodiments of the present disclosure.

FIG. 14 is a ladder diagram illustrating a communication protocol 1400 between a plurality of electronic devices (for example, the electronic device 1410 and an electronic device 1430) according to various embodiments of the present disclosure.

Referring to FIG. 14, for example, the communication protocol 1400 may include a device discovery protocol 1451, a capability exchange protocol 1453, a network protocol 1455, and an application protocol 1457.

According to an embodiment of the present disclosure, the device discovery protocol 1451 may be a protocol according to which electronic devices (for example, the electronic device 1410 or the electronic device 1430) senses an external electronic device capable of communicating with the electronic devices or connect to the sensed external electronic device. For example, the electronic device 1410 (for example, the electronic device 101) may sense the electronic device 1430 (for example, the electronic device 104) as a device capable of communicating with the electronic device 1410, through a communication method (for example, Wi-Fi, BT, or USB) available in the electronic device 1410, by using the device discovery protocol 1451. The electronic device 1410 may obtain and store identification information regarding the sensed electronic device 1430 by using the device discovery protocol 1451 for communication connection with the electronic device 1430. For example, the electronic device 1410 may establish communication connection with the electronic device 1430 based on at least the identification information.

According to an embodiment of the present disclosure, the device discovery protocol 1451 may be a protocol for mutual authentication among a plurality of electronic devices. For example, the electronic device 1410 may perform authentication between the electronic device 1410 and the electronic device 1830 based on communication information (for example, a media access control (MAC) address, a universally unique identifier (UUID), a subsystem identification (SSID), and an internet protocol (IP) address).

According to an embodiment of the present disclosure, the capability exchange protocol 1453 is a protocol for exchanging information associated with a capability of a service that may be supported in at least one of the electronic device 1410 and the electronic device 1430. For example, the electronic device 1410 and the electronic device 1430 may exchange information associated with a capability of a service currently provided by each of them through the function exchange protocol 1453. The exchangeable information may include identification information indicating a particular service among the plurality of services that may be supported by the electronic device 1410 and the electronic device 1430. For example, the electronic device 1410 may receive identification information of a particular service provided by the electronic device 1830 from the electronic device 1430 through the capability exchange protocol 1453. In this case, the electronic device 1410 may determine based on the received identification information whether the electronic device 1410 can support the particular service.

According to an embodiment of the present disclosure, the network protocol 1455 may be a protocol for controlling a flow of data transmitted and received to provide a service through interworking between electronic devices (for example, the electronic device 1410 and the electronic device 1430) connected for communication therebetween. For example, at least one selected from among the electronic device 1410 and the electronic device 1830 may perform error control or data quality control by using the network protocol 1455. Additionally or alternatively, the network protocol 1455 may determine a transmission format of data transmitted and received between the electronic device 1410 and the electronic device 1430. At least one selected from the electronic device 1410 and the electronic device 1430 may manage (for example, connect or terminate) at least a session for data exchange by using the network protocol 1455.

According to an embodiment of the present disclosure, the application protocol 1457 may be a protocol for providing a procedure or information for exchanging data associated with a service provided to the external electronic device. For example, the electronic device 1410 (for example, the electronic device 101) may provide a service to the electronic device 1430 (for example, the electronic device 104 or the server 106) through the application protocol 1457.

According to an embodiment of the present disclosure, the communication protocol 1400 may include a standard communication protocol, a communication protocol designated by an individual or an organization (for example, a communication protocol designated by a communication device manufacturer or a network supplier), or a combination thereof.

The term "module" used in various embodiments of the present disclosure may refer to, for example, a "unit" including one of hardware, software, and firmware, or a combination of two or more thereof. The term "module" can be interchangeable with other terms such as unit, logic, logical block, component, or circuit. A "module" may be a minimum unit of integrally configured components or a part thereof. A "module" may be a minimum unit for performing one or more functions or a part thereof. A "module" may be mechanically or electronically implemented. For example, a "module" according to various embodiments of the present disclosure may include at least one of an application-specific IC (ASIC) chip, a field-programmable gate arrays (FPGAs), and a programmable-logic device for performing operations which has been known or will be developed in the future.

At least a part of a device (for example, modules or functions thereof) or a method (for example, operations) according to various embodiments of the present disclosure may be implemented by instructions stored in the form of program modules in a non-transitory computer-readable storage media. When the instruction is executed by a processor (for example, the processor 120), the one or more processors may perform a function corresponding to the instruction. The non-transitory computer-readable storage medium may be, for example, the memory 130. At least a part of the programming module may be implemented (for example, executed) by, for example, the processor 120. At least a part of the programming module may include, for example, a module, a program, a routine, sets of instructions, or a process to perform one or more functions.

The non-transitory computer readable recording media may include a hardware device specially configured to store and perform a program command (for example, a programming module), including a magnetic media such as a hard disc, a floppy disc, and a magnetic tape, an optical recording media such as a compact disc ROM (CD-ROM) and a DVD, a magneto-optical media such as a floptical disk, and a hardware device, such as a ROM, a RAM, and a flash memory, specifically configured to store and execute program instructions. In addition, the program instructions may include high class language codes, which may be executed in a computer by using an interpreter, as well as machine codes made by a compiler. The aforementioned hardware device may be configured to operate as one or more software modules in order to perform the operation of the present disclosure, and vice versa.

The module or program module according to various embodiments of the present disclosure may include at least one of the above-described elements, exclude some of them, or further include other elements. The operations performed by the module, the program module, or other elements according to various embodiments of the present disclosure may be executed in a sequential, parallel, repeated, or heuristic manner. Also, some operations may be executed based on a different order, may be omitted, or may additionally include another operation.

The present disclosure provides an electronic device capable of adjust a resolution of a display device to a high-end resolution without scaling up image processing and memory resources, and an image processing method for the electronic device.

The effects of the present disclosure are not limited to the above-described effects, and it would be obvious to those of ordinary skill in the art that various effects are included in the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for encoding an image, the method comprising:
converting an original image into a down image by downscaling the original image;
converting the down image into an up image by upscaling the down image;
calculating a pixel-specific luminance variation between the original image and the up image by using a local average luminance for each pixel included in the original image;
converting the pixel-specific luminance variation into a first variation binary signal by binarizing the luminance variation;
converting the first variation binary signal into a second variation binary signal by simplifying the first variation binary signal; and
outputting the second variation binary signal by including the second variation binary signal in the down image.

2. The method of claim 1, wherein the outputting of the second variation binary signal by including the second variation binary signal in the down image comprises:
performing run length encoding with respect to the second variation binary signal; and
outputting the second variation binary signal, which is run-length-encoded, by including the second variation binary signal in the down image.

3. The method of claim 1, wherein the pixel-specific luminance variation between the original image and the up image is calculated using:

$$\Delta L = \frac{W_R(r_i - \bar{r}) + W_G(g_i - \bar{g}) + W_B(b_i - \bar{b})}{W_R + W_G + W_B},$$

where ($W_R$, $W_G$, $W_B$) respectively indicates luminance values of red, green, and blue, ($r_i$, $g_i$, $b_i$) respectively indicates input color coordinates of red, green, and blue, and ($\bar{r}$, $\bar{g}$, $\bar{b}$) respectively indicates local average reference values of red, green, and blue.

4. The method of claim 1, wherein the converting of the pixel-specific luminance variation into the first variation binary signal by binarizing the luminance variation comprises converting the pixel-specific luminance variation into a binary signal having a 1 sign bit and 8 magnitude bits.

5. The method of claim 4, wherein the converting of the first variation binary signal into the second variation binary signal by simplifying the first variation binary signal comprises changing at least one of magnitude bits of the first variation binary signal into a value of a least significant bit (LSB) of the magnitude bits.

6. The method of claim 4, wherein the converting of the first variation binary signal into the second variation binary signal by simplifying the first variation binary signal comprises changing at least one of magnitude bits of the first variation binary signal into a value of a most significant bit (MSB) of the magnitude bits.

7. At least one non-transitory computer readable storage medium for storing a computer program of instructions configured to be readable by at least one processor for instructing the at least one processor to execute a computer process for performing the method of claim 1.

8. An electronic device for performing side-channel encoding of an image, the electronic device comprising:

a memory configured to store an original image; and
a processor configured to:
- convert the original image into a down image by downscaling the original image,
- convert the down image into an up image by upscaling the down image,
- calculate a pixel-specific luminance variation between the original image and the up image by using a local average luminance for each pixel included in the original image,
- convert the pixel-specific luminance variation into a first variation binary signal by binarizing the luminance variation,
- convert the first variation binary signal into a second variation binary signal by simplifying the first variation binary signal, and
- output the second variation binary signal by including the second variation binary signal in the down image.

9. The electronic device of claim 8, wherein the processor is configured to perform run length encoding with respect to the second variation binary signal and output the second variation binary signal, which is run-length-encoded, by including the second variation binary signal in the down image.

10. The electronic device of claim 8, wherein the pixel-specific luminance variation between the original image and the up image is calculated using:

$$\Delta L = \frac{W_R(r_i - \bar{r}) + W_G(g_i - \bar{g}) + W_B(b_i - \bar{b})}{W_R + W_G + W_B},$$

where ($W_R$, $W_G$, $W_B$) respectively indicates luminance values of red, green, and blue, ($r_i$, $g_i$, $b_i$) respectively indicates input color coordinates of red, green, and blue, and ($\bar{r}$, $\bar{g}$, $\bar{b}$) respectively indicates local average reference values of red, green, and blue.

11. The electronic device of claim 8, wherein the processor is configured to convert the pixel-specific luminance variation into a binary signal having a 1 sign bit and 8 magnitude bits to convert the pixel-specific luminance variation into the first variation binary signal by binarizing the luminance variation.

12. The electronic device of claim 11, wherein the processor is configured to change at least one of magnitude bits of the first variation binary signal into a value of a least significant bit (LSB) of the magnitude bits to convert the first variation binary signal into the second variation binary signal by simplifying the first variation binary signal.

13. The electronic device of claim 11, wherein the processor is configured to change at least one of magnitude bits of the first variation binary signal into a value of a most significant bit (MSB) of the magnitude bits to convert the first variation binary signal into the second variation binary signal by simplifying the first variation binary signal.

* * * * *